(12) United States Patent
Kim et al.

(10) Patent No.: US 11,757,790 B2
(45) Date of Patent: Sep. 12, 2023

(54) METHOD AND SERVER FOR ADJUSTING ALLOCATION OF COMPUTING RESOURCES TO PLURALITY OF VIRTUALIZED NETWORK FUNCTIONS (VNFS)

(71) Applicant: Samsung Electronics Co., Ltd., Suwon-si (KR)

(72) Inventors: Kyungrae Kim, Suwon-si (KR); Youngmin Won, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 17/435,951

(22) PCT Filed: Jun. 24, 2021

(86) PCT No.: PCT/KR2021/007944
§ 371 (c)(1),
(2) Date: Sep. 2, 2021

(87) PCT Pub. No.: WO2022/050541
PCT Pub. Date: Mar. 10, 2022

(65) Prior Publication Data
US 2022/0329539 A1     Oct. 13, 2022

(30) Foreign Application Priority Data

Sep. 2, 2020   (KR) .......................... 10-2020-0111765

(51) Int. Cl.
*H04L 29/02*      (2006.01)
*H04L 47/78*      (2022.01)
(Continued)

(52) U.S. Cl.
CPC ............ *H04L 47/781* (2013.01); *H04L 41/16* (2013.01); *H04L 43/062* (2013.01); *H04L 47/762* (2013.01); *H04L 47/801* (2013.01)

(58) Field of Classification Search
CPC ...... H04L 47/781; H04L 41/16; H04L 43/062
See application file for complete search history.

(56) References Cited

U.S. PATENT DOCUMENTS

| | | | |
|---|---|---|---|
| 7,552,100 B2 | 6/2009 | Chen | |
| 8,601,288 B2 | 12/2013 | Brinks et al. | |

(Continued)

FOREIGN PATENT DOCUMENTS

| | | |
|---|---|---|
| CN | 102622273 | 8/2012 |
| CN | 111597050 | 8/2020 |

(Continued)

OTHER PUBLICATIONS

Search Report dated Sep. 14, 2021 in counterpart International Patent Application No. PCT/KR2021/007944 and English-language translation.

*Primary Examiner* — Adnan M Mirza
(74) *Attorney, Agent, or Firm* — Nixon & Vanderhye, P.C.

(57) ABSTRACT

A method, performed by a server, of adjusting allocation of computing resources to a plurality of virtualized network functions (VNFs), and the server are provided. The method includes: for processing at least one task related to user equipments (UEs) connected to the server, identifying a plurality of VNFs related to the task; obtaining predicted traffic expected to be generated in the server by processing the task via the plurality of VNFs; obtaining, from at least one associated server, status information of computing resources in the at least one associated server; and adjusting allocation of computing resources to the plurality of VNFs based on the status information of the computing resources (Continued)

in the at least one associated server and the predicted traffic, wherein the at least one associated server includes another server that processes the task.

17 Claims, 7 Drawing Sheets

(51) Int. Cl.
*H04L 41/16* (2022.01)
*H04L 43/062* (2022.01)
*H04L 47/762* (2022.01)
*H04L 47/80* (2022.01)

(56) References Cited

U.S. PATENT DOCUMENTS

| | | |
|---|---|---|
| 9,571,561 B2 | 2/2017 | Jang |
| 10,218,729 B2 | 2/2019 | Gay et al. |
| 2012/0022910 A1 | 1/2012 | Chi et al. |
| 2015/0288571 A1* | 10/2015 | Baughman ............ H04L 41/147 703/21 |
| 2017/0031706 A1 | 2/2017 | Podvratnik et al. |
| 2018/0262413 A1 | 9/2018 | Sureka |
| 2018/0295067 A1* | 10/2018 | Xia .................... H04L 41/5003 |
| 2019/0303203 A1 | 10/2019 | Guan et al. |
| 2020/0159281 A1 | 5/2020 | Seenappa et al. |

FOREIGN PATENT DOCUMENTS

| | | |
|---|---|---|
| KR | 10-2014-0086436 | 7/2014 |
| KR | 10-1474872 | 12/2014 |
| KR | 10-2019-0007635 | 1/2019 |

* cited by examiner

METHOD AND SERVER FOR ADJUSTING ALLOCATION OF COMPUTING RESOURCES TO PLURALITY OF VIRTUALIZED NETWORK FUNCTIONS (VNFS)

CROSS-REFERENCE TO RELATED APPLICATIONS

This application is the U.S. national phase of International Application No. PCT/KR2021/007944 filed Jun. 24, 2021 which designated the U.S. and claims priority to Korean Application No. 10-2020-0111765 filed Sep. 2, 2020, the entire contents of each of which are hereby incorporated by reference.

BACKGROUND

1. Field

The disclosure relates to a method of adjusting allocation of computing resources to a plurality of virtualized network functions (VNFs) based on status information of computing resources within an associated server.

2. Description of Related Art

Due to advancements in ideas and technologies such as cloud computing and virtualization, architectural transformations in the field of traditional communication networks are underway. Closed is replaced with open, exclusivity is replaced with generality, and network functions (NFs) on communication network elements are extracted and virtualized for execution on a general hardware platform.

NF Virtualization (NFV) is a technology for replacing an existing network with high dependence on dedicated hardware to configure a network via commercial high-performance servers, storage devices, and switches, and provides flexible management by virtualizing various network functions required for service provision.

NFV uses commercial hardware to perform various network software functions. Accordingly, NFV may implement flexible software configuration at locations such as data centers and wide area networks (WANs). In addition, NFV may reduce complexity of service deployment or overall investment costs and improve generalization and adaptability of network devices. In a communication network, functions of some standard network elements, such as Gateway General Packet Radio Service (GPRS) Support Node (GGSN) and Mobility Management Entity (MME), may be virtualized and installed on a general hardware device in a data center.

In such NFV, one or more VNFs for implementing network services may be defined. Physical/virtual network resources may be automatically allocated to VNFs required when implementing each network service. For example, NFV Management and Orchestration (MANO) (especially an orchestrator of MANO) may automatically manage allocation of computing resources depending on various factors such as network service requirements, maximum performance and capacity of computing resources, computing resource management policies of network operators, changes in the real-time status of network services and computing resources, etc.

Moreover, in NFV, when an insufficient or extremely large amount of computing resources is allocated to a particular VNF, it is necessary to adjust allocation of the computing resources. However, in related art, fixed computing resources have been allocated without considering the amount of computing resources required for each VNF. When fixed computing resources are allocated, this may lead to a waste of computing resources or an inability to respond quickly to changing traffic.

Network services are becoming more diverse, and data needs to be processed with lower latency and higher reliability. Accordingly, there is a need for a technology capable of effectively adjusting allocation of computing resources to a plurality of VNFs in a server.

SUMMARY

Embodiments of the disclosure provide a method and server capable of responding quickly to an unpredicted traffic pattern and efficiently utilizing computing resources by predicting traffic to be generated in a server and adjusting allocation of the computing resources to a plurality of virtualized network functions (VNFs) based on the predicted traffic and status information of computing resources in an associated server.

Embodiments of the disclosure provide a method and server capable of increasing prediction accuracy and improving or optimizing allocation of computing resources by predicting traffic to be generated in a server and adjusting allocation of the computing resources using one or more artificial intelligence (AI) models.

Additional aspects will be set forth in part in the description which follows and, in part, will be apparent from the description.

According to an example embodiment of the disclosure, a method, performed by a server, of adjusting allocation of computing resources to a plurality of VNFs includes: identifying, for processing at least one task related to user equipments (UEs) connected to the server, a plurality of VNFs related to the task; obtaining predicted traffic expected to be generated in the server by processing the task via the plurality of VNFs; obtaining, from at least one associated server, status information of computing resources in the at least one associated server; and adjusting allocation of computing resources to the plurality of VNFs based on the status information of the computing resources in the at least one associated server and the predicted traffic. The at least one associated server includes another server that processes the task related to the UEs connected to the server.

According to another example embodiment of the disclosure, a server for adjusting allocation of computing resources to a plurality of VNFs includes: a plurality of computing resources; a communication interface; a storage storing a program including one or more instructions; and at least one processor configured to execute the one or more instructions stored in the storage to: identify, for processing at least one task related to user equipments (UEs) connected to the server, a plurality of VNFs related to the task; obtain predicted traffic expected to be generated in the server by processing the task via the plurality of VNFs; obtain, from at least one associated server, status information of computing resources in the at least one associated server, through the communication interface; and adjust allocation of the computing resources to the plurality of VNFs based on the status information of the computing resources in the at least one associated server and the predicted traffic. The at least one associated server includes another server that processes the task related to the UEs connected to the server.

According to another example embodiment of the disclosure, a recording medium (for example, a non-transitory computer-readable recording medium) has stored therein a program for executing at least one of embodiments of the above method.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EXAMPLE EMBODIMENTS

Figure 1:
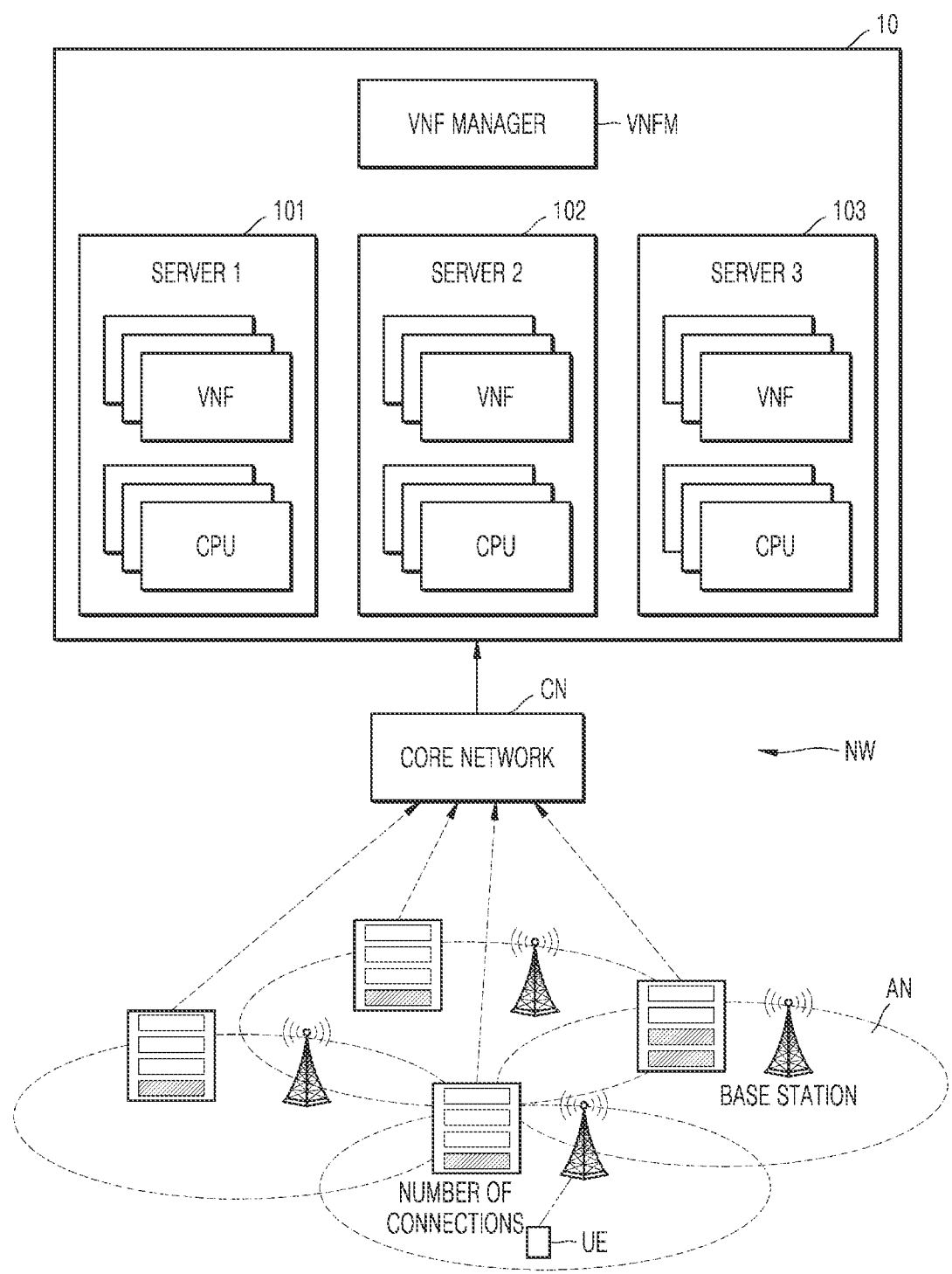
FIG. 1 illustrates a network architecture in network function virtualization (NFV), including a server, according to various example embodiments of the disclosure.

Aspects of the disclosure are to address at least the above-mentioned problems and/or disadvantages and to provide at least the advantages described below.

In a first aspect, a method may be provided for a server to adjust the allocation of computing resources for a plurality of Virtualized Network Functions (VNFs). The method includes: identifying, for processing at least one task related to user equipments (UEs) connected to the server, a plurality of VNFs related to the task; obtaining predicted traffic expected to be generated in the server by processing the task via the plurality of VNFs; obtaining, from at least one associated server, status information of computing resources in the at least one associated server; and adjusting allocation of the computing resources to the plurality of VNFs based on the status information of the computing resources in the at least one associated server and the predicted traffic, wherein the at least one associated server includes another server that processes the task.

Alternatively, the at least one associated server includes at least one of another server including the plurality of VNFs related to the task, another server that shares a top of rack (ToR) switch with the server, or another server for processing tasks related to an area that matches a part of a physical area corresponding to the task processed by the server.

Alternatively, the status information of the computing resources in the at least one associated server includes at least one of information about allocation of the computing resources to a plurality of VNFs in the at least one associated server, information about an occupancy rate of the computing resources in the at least one associated server, information related to whether central processing unit (CPU) cores in the at least one associated server are turned on or off, or information about a clock speed of the CPU cores in the at least one associated server.

Alternatively, the method further comprises receiving, from a VNF manager that manages servers that together process the task related to the UEs and the plurality of VNFs, identification information of the plurality of VNFs and identification information of the at least one associated server.

Alternatively, the obtaining of the predicted traffic comprises obtaining the predicted traffic according to a plurality of preset periods.

Alternatively, the obtaining of the predicted traffic comprises obtaining the predicted traffic using a first artificial intelligence (AI) model, and the adjusting of the allocation of the computing resources to the plurality of VNFs comprises adjusting the allocation of the computing resources using a second AI model.

Alternatively, the first AI model includes a deep neural network (DNN) with a long short-term memory (LSTM) structure and is trained to obtain the predicted traffic using, as input values, traffic history information and waiting traffic waiting in a buffer of the server.

Alternatively, the method further comprises: obtaining real traffic generated in the server by processing the task via the plurality of VNFs; obtaining a prediction error based on the predicted traffic and the real traffic; determining whether to refine the first AI model based on a result of a comparison between the prediction error and a preset threshold; and refining the first AI model based on a determination to refine the first artificial intelligence model.

Alternatively, the second AI model includes a multi-agent deep reinforcement learning model and is trained to adjust the allocation of the computing resources in the server using, as input values, the predicted traffic, status information of the computing resources in the server, and the status information of the computing resources in the at least one associated server.

Alternatively, the method further comprises: obtaining information about at least one of information about a server's power usage, information about a server's temperature rise, information related to a delay in processing the task by the server, or a workload associated with the task processed by the server; obtaining a compensation value based on the obtained information; determining whether to refine the second AI model based on a result of a comparison between the compensation value and a threshold; and refining the second AI model based on a determination to refine the second AI model.

In a second aspect, a server for adjusting allocation of computing resources to a plurality of virtualized network functions (VNFs) may be provided. The server comprises: a plurality of computing resources; a communication interface configured to communicate with other servers or a core network; a storage storing a program including one or more instructions; and at least one processor. The at least one processor is configured to execute the one or more instructions stored in the storage to: identify, for processing at least one task related to user equipments (UEs) connected to the server, a plurality of VNFs related to the task; obtain predicted traffic expected to be generated in the server by processing the task via the plurality of VNFs; obtain, from at least one associated server, status information of computing resources in the at least one associated server, through the communication interface; and adjust allocation of the computing resources to the plurality of VNFs based on the status information of the computing resources in the at least one associated server and the predicted traffic. The at least one associated server includes another server that processes the task.

Alternatively, the at least one associated server includes at least one of another server including the plurality of VNFs related to the task, another server that shares a top of rack (ToR) switch with the server, or another server for processing tasks related to an area that matches a part of a physical area corresponding to the task processed by the server.

Alternatively, the status information of the computing resources in the at least one associated server includes at least one of information about allocation of the computing resources to a plurality of VNFs in the at least one associated server, information about an occupancy rate of the computing resources in the at least one associated server, information related to whether central processing unit (CPU) cores in the at least one associated server are turned on or off, or information about a clock speed of the CPU cores in the at least one associated server.

Alternatively, the at least one processor is further configured to execute the one or more instructions to receive, from a VNF manager that manages servers that together process the task related to the UEs and the plurality of VNFs, identification information of the plurality of VNFs and identification information of the at least one associated server.

Alternatively, the at least one processor is further configured to execute the one or more instructions to: obtain the predicted traffic using a first artificial intelligence (AI) model; and adjust the allocation of the computing resources to the plurality of VNFs by using a second AI model.

Alternatively, the first AI model includes a deep neural network (DNN) with a long short-term memory (LSTM) structure and is trained to obtain the predicted traffic using, as input values, traffic history information and waiting traffic waiting in a buffer of the server.

Alternatively, the at least one processor is further configured to execute the one or more instructions to: obtain real traffic generated in the server by processing the task via the plurality of VNFs; obtain a prediction error based on the predicted traffic and the real traffic; determine whether to refine the first AI model based on a result of a comparison between the prediction error and a preset threshold; and refine the first AI model based on a determination to refine the first artificial intelligence model.

Alternatively, the second AI model includes a multi-agent deep reinforcement learning model and is trained to adjust the allocation of the computing resources in the server using, as input values, the predicted traffic, status information of the computing resources in the server, and the status information of the computing resources in the at least one associated server.

Alternatively, the at least one processor is further configured to execute the one or more instructions to: obtain information about at least one of information about a server's power usage, information about a server's temperature rise, information related to a delay in processing the task by the server, or a workload associated with the task processed by the server; obtain a compensation value based on the obtained information; determine whether to refine the second AI model based on a result of a comparison between the compensation value and a threshold; and refine the second AI model based on a determination to refine the second AI model.

In a third aspect, a non-transitory computer-readable recording medium having recorded thereon a program for implementing the method of adjusting allocation of computing resources to a plurality of virtualized network functions (VNFs) may be provided.

Hereinafter, various example embodiments of the disclosure will be described in greater detail with reference to the accompanying drawings. However, it should be understood that the disclosure may have different forms and is not limited to the various example embodiments set forth herein and may be embodied in different ways. Parts not related to the description of the example embodiments in the present disclosure are omitted in the drawings so that an explanation of the example embodiments of the disclosure may be clearly set forth, and like reference numerals denote like elements throughout the drawings.

Throughout the disclosure, the expression "at least one of a, b or c" indicates only a, only b, only c, both a and b, both a and c, both b and c, all of a, b, and c, or variations thereof.

Although terms used herein are among general terms that are currently and broadly used by considering functions in the disclosure, these terms may vary according to intentions of those of ordinary skill in the art, precedents, the emergence of new technologies, or the like. Furthermore, specific terms may be arbitrarily selected by the applicant, and in this case, the meaning of the selected terms will be described in detail in the detailed description of a corresponding embodiment. Thus, the terms used herein should be defined based on the meaning thereof and descriptions made throughout the disclosure, rather than simply on names used.

Singular expressions used herein are intended to include plural expressions as well, unless the context clearly indicates them as singular. All the terms used herein, which include technical or scientific terms, may have the same meaning that is generally understood by a person of ordinary skill in the art.

Throughout the disclosure, when a part "includes" or "comprises" an element, unless there is a particular description to the contrary, the part may further include other elements, not excluding the other elements. Furthermore, terms, such as ". . . unit", ". . . portion," ". . . module," or the like used herein refer to a unit for processing at least one function or operation and may be embodied as hardware or software or a combination of hardware and software.

Throughout the disclosure, it will be understood that when an element is referred to as being "connected" or "coupled" to another element, it may be "directly connected" to or "electrically coupled" to the other element with one or more intervening elements interposed therebetween.

The expression "configured to (or set to)" used herein may be used interchangeably, according to context, with, for example, the expression "suitable for," "having the capacity to," "designed to," "adapted to," "made to," or "capable of". The term "configured to (or set to)" may not necessarily refer only "specifically designed to" in terms of hardware. Instead, the expression "a system configured to" may mean, in some contexts, the system being "capable of", together with other devices or components. For example, the expression "a processor configured to (or set to) perform A, B, and C" may mean a dedicated processor (e.g., an embedded processor) for performing the corresponding operations or a general-purpose processor (e.g., a central processing unit (CPU) or an application processor (AP)) capable of performing the corresponding operations by executing one or more software programs stored in a memory.

According to the disclosure, functions related to artificial intelligence (AI) may operate via a processor and a memory. The processor may be composed of one or a plurality of processors. In this case, the one or plurality of processors may be a general-purpose processor such as a CPU, an AP, or a digital signal processor (DSP), a dedicated graphics processor such as a graphical processing unit (GPU) or a vision processing unit (VPU), or a dedicated AI processor such as a neural processing unit (NPU). The one or plurality of processors may control input data to be processed according to predefined operation rules or an AI model stored in the memory. Alternatively, when the one or plurality of processors are a dedicated AI processor, the dedicated AI processor may be designed with a hardware structure specialized for processing a particular AI model.

The predefined operation rules or AI model may be created via a training process. The creation via the training process may refer to the predefined operation rules or AI model set to perform desired characteristics (or purpose) created by training a basic AI model based on a large number of training data via a learning algorithm. The training process may be performed by a device itself in which AI is performed or via a separate server and/or system. Examples of a learning algorithm may include, but are not limited to, supervised learning, unsupervised learning, semi-supervised learning, and reinforcement learning.

An AI model may consist of a plurality of neural network layers. Each of the plurality of neural network layers may have a plurality of weight values and may perform neural network computations via calculations between a result of computations in a previous layer and the plurality of weight values. A plurality of weight values assigned to each of the plurality of neural network layers may be optimized by a result of training the AI model. For example, a plurality of weight values may be refined to reduce or minimize a loss or cost value obtained in the AI model during a training process. An artificial neural network may include a deep neural network (DNN) and may be, for example, a convolutional neural network (CNN), a DNN, a recurrent neural network (RNN), a restricted Boltzmann machine (RBM), a deep belief network (DBN), a bidirectional recurrent DNN (BRDNN), or deep Q-networks (DQN) but is not limited thereto.

In the disclosure, a "server" may refer to a computer system that provides information or services to a user equipment (UE) or a client over a network and may refer to a server program or a device. The server may monitor or control an entire network, such as file management, or connect the network to another network through a mainframe or public network. The server may allow sharing of software resources such as data, programs, files, etc., and hardware resources such as modems, fax machines, and routers. The server may provide services according to a request from a user (client). The server may run one or more application programs using distributed processing in a cooperative environment.

In the disclosure, "network function virtualization (NFV)" may refer to a technology for virtualizing NFs. NFV uses information technology (IT) virtualization technology to create communication services, and may virtualize all classes of network node functions into building blocks that may chain together or are connectable. NFV technology is a technology for implementing a software-centric network infrastructure by shifting from a hardware-centric network infrastructure to a general-purpose cloud infrastructure environment. For example, through NFV, expensive dedicated hardware devices such as routers, firewalls, and load balancers in servers may be replaced with software-based network appliances running as virtual machines (VMs). Through NFV, NFs may be decoupled from dedicated hardware devices and then moved to VMs, so that multiple NFs may be integrated into a single physical server including the VMs. In terms of system operation and maintenance, problems may inevitably occur with hardware failure/repair/replacement, software updates (e.g., updates for purposes such as addition of function and debugging, etc.), aging of equipment over time, or the like. Replacing a closed physical system with a logical system through virtualization may minimize infrastructure maintenance costs and maximize equipment utilization efficiency in infrastructure, facilitate addition of new equipment during system operation, and increase user convenience in operation management for a system via remote monitoring and integrated management. In other words, NFV may replace expensive network hardware with simple software appliances. Moreover, a network service in NFV may be provided through a service chain that is a set of a sequence of VNFs.

In the present disclosure, a 'VNF' may refer to an NF or a part of thereof running as software. A VNF may be implemented via a VM. A VNF may include at least one VM running different software and processes on standard high-capacity servers, switches, storage devices, or a cloud computing infrastructure, instead of custom hardware appliances for an NF. For example, a VNF may include one or more VMs for routing, firewalls, load balancing, WAN acceleration, encryption, etc.

In the disclosure, a 'data center' may refer to a network system for providing servers, network lines, etc. The data center may also be referred to as a "server hotel." The data center may include a plurality of servers. A data center of a telecommunication company may also be referred to as an Internet data sensor (IDC) or a cloud data center.

In the disclosure, "work" or "task" may refer to a service provided to UEs connected to a server, and "processing of work" or "processing of task" may refer to performing an operation for providing a service.

In the disclosure, "traffic" generated in a server may represent the amount of tasks (workload) to be processed by the server according to a service provision request from UEs connected to the server.

In the disclosure, "predicted traffic" may refer to traffic to be generated at a particular time point in a server. For example, the "predicted traffic" may be related to how many service provision requests are to be received from connected UEs at a particular time point, and what level of workload associated with tasks is to be processed by the server.

In the disclosure, "real traffic" may refer to traffic actually generated in a server at a particular time point. For example, "real traffic" may be related to how many service provision requests are received from actually connected UEs at a particular time point and what level of workload associated with tasks is to be processed by the server.

In the disclosure, "waiting traffic" may refer to traffic waiting in a buffer of a server. For example, the "waiting traffic" may refer to a workload associated with tasks waiting in the buffer to be processed. A "buffer" may refer to an area of memory that temporarily stores data while transferring the data from one place to another in a computing operation. The buffer may also be referred to as a 'queue' or a 'waiting queue'.

In the disclosure, a "computing resource" may refer to a CPU as a resource for computing. For example, a millisecond (ms) may be used as a unit to define computing resources, and about 1000 ms of computing resources may constitute 1 vCore (unit virtual CPU core).

Hereinafter, the various example embodiments of the disclosure will be described in detail with reference to the accompanying drawings.

FIG. 1 illustrates a network architecture in NFV, including a server, according to various example embodiments of the disclosure.

Referring to FIG. 1, a network NW in a mobile communication system may include a core network CN and an access network AN. The core network CN may, for example, perform a function of managing subscriber information, a function of connecting with a wired telephone network service, and a function of providing other additional services. The core network CN may be divided into a (first) part for performing overall management of the network NW and a (second) part connected to the access network AN for each region. The access network AN is a network directly connected to a subscriber or UE, and may connect a network service to the UE or transmit or receive information to or from the UE. A base station is a main base of the access network AN. In addition, the access network AN may be connected to the core network CN.

In various example embodiments, a UE may request a service from the access network AN via the base station. Information related to the received service request may be transmitted from the access network AN to the core network CN. The core network CN may request a data center 10 connected thereto to process at least one task related to the received service request. In an example embodiment, when indicating traffic generated in the server included in the data center 10, the number of connections occurring between a base station and UEs may be considered. For example, the number of connections occurring between the base station and the UEs may be referred to as traffic generated outside the server, and this may indicate the number of service provision requests from UEs.

At least one NF is associated with a task(s) related to UEs, and referring to FIG. 1, information about a task(s) related to a UE may be transmitted from the UE to the data center 10 through the access network AN and the core network CN. The task(s) related to the UE transmitted to the data center 10 may be processed by a plurality of servers, i.e., server 1 (101), server 2 (102), and server 3 (103) in the data center 10. In an example embodiment of the disclosure, the data center 10 may further include a VNF manager (VNFM).

The VNFM may define one or more VNFs for tasks related to UEs from NFs related to the tasks related to the UEs. Thereafter, the VNFM may assign each of the defined VNFs to the server 1 (101), server 2 (102), and server 3 (103). In various example embodiments, a particular VNF may be assigned to a plurality of servers and a particular server may be assigned a plurality of VNFs. For example, at least some of the VNFs allocated to each server may be different from one another.

The server 1 (101), server 2 (102), and server 3 (103) may, for example, be computer systems and may directly process a task(s) related to UEs. In other words, each of the servers 101, 102, and 103 may process a task(s) requested by a UE via VNFs assigned by the VNFM. Each of the servers 101, 102, and 103 may allocate computing resources (e.g., a CPU) required for calculation to the assigned VNFs and adjust the allocation thereof. For example, each of the servers 101, 102, and 103 may adjust how to distribute computing resources (CPU) possessed by the corresponding server among assigned VNFs and how to set a clock speed of each computing resource (CPU).

An example method, performed by each server, of adjusting allocation of computing resources (CPU) possessed by the server to a plurality of VNFs assigned thereto will now be described in more detail.

Figure 2:
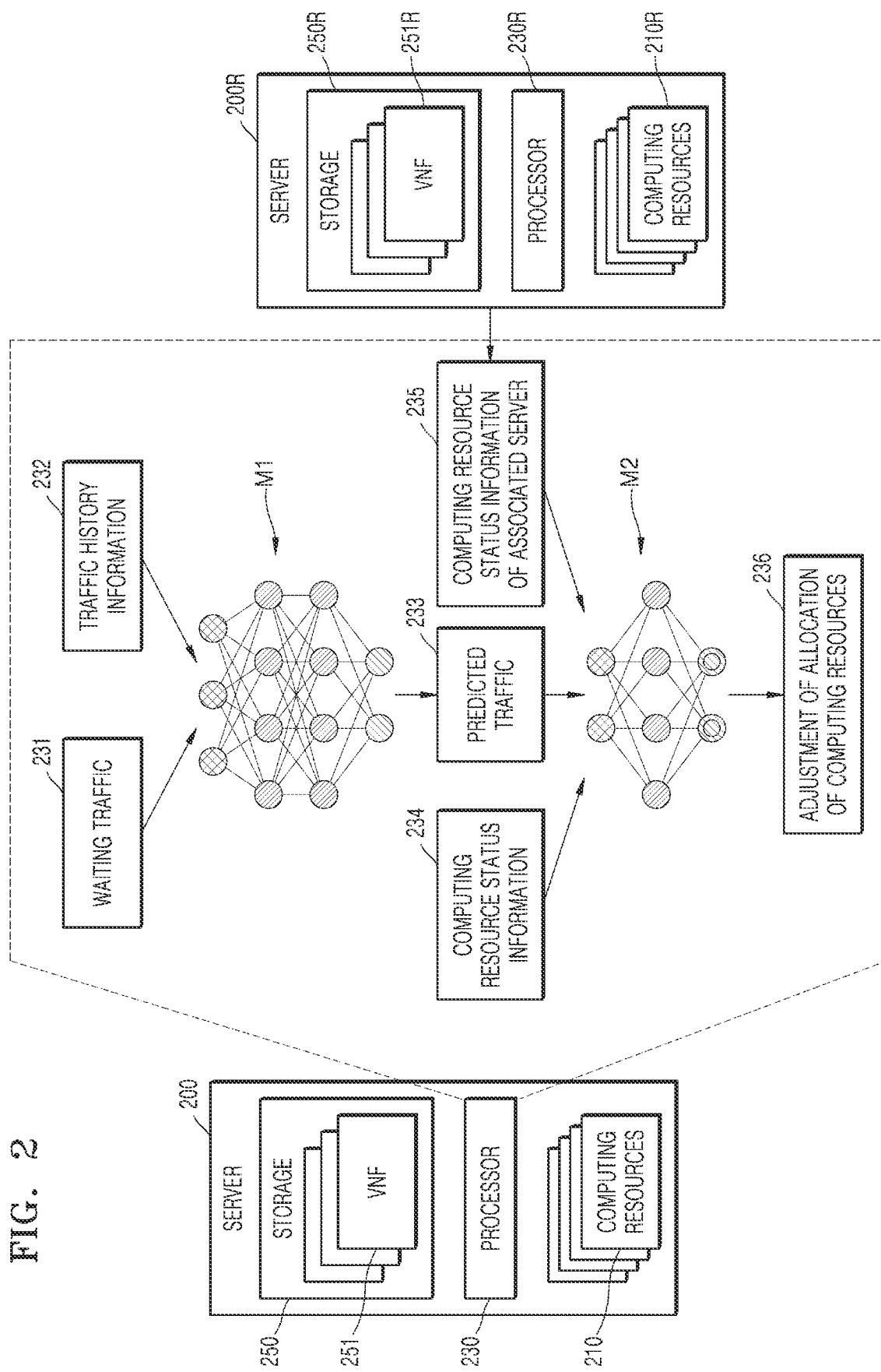
FIG. 2 illustrates a method, performed by a server, of adjusting allocation of computing resources to a plurality of virtualized network functions (VNFs), according to various example embodiments of the disclosure.

FIG. 2 illustrates a method, performed by a server 200, of adjusting allocation of a plurality of computing resources 210 to a plurality of VNFs 251, according to various example embodiments.

Referring to FIG. 2, the server 200 may include computing resources 210, a processor 230, and a storage 250. In an example embodiment of the disclosure, the storage 250 may include VNFs 251. In an example embodiment of the disclosure, the processor 230 may allocate the computing resources 210 to the VNFs 251 and adjust the allocation.

In a method, performed by the server 200, of adjusting allocation of the computing resources 210 to the VNFs 251, according to various embodiments, an AI model using traffic history information 232 and waiting traffic 231 (that is, the traffic waiting in a buffer of the server 200) may be used for inferring or obtaining predicted traffic 233 (that is, the traffic expected to be generated in the server 200). In addition, an AI model using the predicted traffic 233, status information 234 of the computing resources 210 in the server 200 itself, and status information 235 of computing resources 210R in an associated server 200R may be used for adjusting allocation of the computing resources to the VNFs 251. The processor 230 may perform preprocessing on each piece of data and convert the data into a form suitable for use as an input of an AI model. An AI model may be created via a training process. The creation via the training process refers, for example, to the predefined operation rules or AI model set to perform desired characteristics (or purpose) being created by training a basic AI model based on a large amount of training data via a learning algorithm. The AI model may include a plurality of neural network layers. Each of the neural network layers may have a respective weight value and may perform neural network computations via calculations between a result of computation in a previous layer and the corresponding weight values.

Reasoning/prediction may, for example, refer to a technology for judging information and then logically inferring and predicting new information and includes, for example, knowledge/probability-based reasoning, optimization prediction, preference-based planning, recommendations, or the like.

The processor 230 may obtain the predicted traffic 233 expected to be generated in the server 200 by processing a task(s) through the VNFs 251. A first AI model M1 may be used in an operation of obtaining the predicted traffic 233.

In various example embodiments, the first AI model M1 is an AI model for obtaining the predicted traffic 233 expected to be generated in the server 200, and may include a DNN. A DNN refers to a type of artificial neural network, and may have a characteristic of including several hidden layers between an input layer and an output layer. DNNs may model complex nonlinear relationships like general artificial neural networks. For example, in a DNN architecture for an object detection model, each object may be expressed as a layered composition of image primitives. In this case, additional layers may gather features gradually propagated from lower layers. These characteristics of a DNN enable modeling of complex data with fewer units. A DNN may be used to obtain a future predicted value as described herein in the present disclosure. For example, the first AI model M1 may include a DNN with a long short-term memory (LSTM) structure.

In various example embodiments, the first AI model M1 may be trained to obtain the predicted traffic 233 using, as input values, the traffic history information 232 and the waiting traffic 231 in the buffer of the server 200. In an example embodiment, the waiting traffic 231 may represent the amount of work waiting in the buffer of the server 200 to be processed. The traffic history information 232 may include past traffic statistics obtained in units of, for example, weeks, days, or time.

For example, in an operation of obtaining the predicted traffic 233 at around 12:00 noon on Sunday, information about how much traffic is usually generated in a server at 'around 12:00 noon on Sunday' may be extracted from a traffic history, and the predicted traffic 233 may be obtained based on the extracted traffic history information 232 and the amount of work currently waiting in a buffer to be processed. In this case, for example, based on determining, according to the extracted traffic history information 232, that the waiting traffic 231 is less than the amount of traffic that is usually generated, the amount of traffic that is to come in the future may be predicted to increase.

As another example, a changing pattern of traffic may be learned based on a traffic history. The traffic history information 232 corresponding to traffic at a previous time point may be extracted from the traffic history, and how the traffic will change at a later time point may be predicted based on the extracted traffic history information 232 and the current waiting traffic 231 according to the learned changing pattern.

The processor 230 may obtain, from at least one associated server 200R, status information 235 of computing resources 210R in the associated server 200R.

The associated server 200R may include another server for processing a task(s) related to UEs connected to the server 200. For example, the associated server 200R may include at least one of a server including a plurality of VNFs related to a task(s), a server that shares a top of rack (ToR) switch with the server 200, or a server for processing a task(s) related to an area that matches a part of a physical area corresponding to the task(s) processed by the server 200.

In various example embodiments, referring to FIG. 2, the associated server 200R may include a server different from the server 200, including a plurality of VNFs 251R related to a task(s), in a storage 250R. In an example embodiment, a task(s) related to services requested by UEs may be processed by a plurality of servers, i.e., the server 200 and the associated server 200R. In this case, the other server including the VNFs 251R that match some of the VNFs 251 allocated to the server 200 may be the associated server 200R.

In various example embodiments, the associated server 200R may include at least one of another server that shares a ToR switch with the server 200 or another server that processes a task(s) related to an area that matches a part of a physical area corresponding to a task(s) processed by the server 200. In an example embodiment, a data center may include several racks, each rack including a plurality of servers and a switch for connecting the servers. In other words, in hardware such as a data center, another server that is located in the same rack as a particular server and shares a ToR switch with the particular server may be an "associated server". Furthermore, another server that processes a task(s) related to an area that matches a physical access network AN area corresponding to a task(s) processed by a particular server may also be an "associated server". The type of associated server is not limited to the description of the example embodiments, and any server having information that may be helpful in adjusting allocation of computing resources in a particular server may be identified as an associated server.

For example, the status information 235 of the computing resources 210R in the associated server 200R may include at least one of information about allocation of the computing resources 210R to the VNFs 251 R in the associated server 200R, information about an occupancy rate of the computing resources 210R in the associated server 200R, information related to whether CPU cores in the associated server 200R are turned on or off, or information about a clock speed of the CPU cores in the associated server 200R. In various example embodiments, the status information 235 of the computing resources 210R in the associated server 200R may be used in an operation of the server 200 for adjusting allocation of its computing resources 210.

The processor 230 may adjust allocation of the computing resources 210 to the VNFs 251 (236) based on the status information 235 of the computing resources 210R in the associated server 200R and the predicted traffic 233. A second AI model M2 may, for example, be used in an operation of adjusting allocation of the computing resources 210 to the VNFs 251.

In various example embodiments, the second AI model M2 may be an AI model for adjusting allocation of the computing resources 210 to the VNFs 251. For example, the second AI model M2 may include a multi-agent deep reinforcement learning model. Reinforcement learning is an area of machine learning in which an agent defined in an environment recognizes a current state and selects an action or sequence of actions that maximizes rewards among the selectable actions. Models built through reinforcement learning may be used in multi-agent systems or optimization control theory. Thus, the multi-agent deep reinforcement learning model may be effectively used to improve or optimize adjustment of computing resource allocation while having multiple inputs, as in the present disclosure.

In various example embodiments, the second AI model M2 may be trained to adjust allocation of the computing resources 210 in the server 200 (236) using, as input values, the predicted traffic 233 and the status information 235 of the computing resources 210R in the associated server 200R. In an example embodiment, the second AI model M2 may further include the status information 234 of the computing resources 210 in the server 200 itself as an input value. For example, the status information 234 of the computing resources 210 may include at least one of information about allocation of the computing resources 210 to the VNFs 251 in the server 200, information about an occupancy rate of the computing resources 210 in the server 200, information related to whether CPU cores in the server 200 are turned on or off, or information about a clock speed of the CPU cores in the server 200.

For example, the operation of adjusting allocation of the computing resources 210 to the VNFs 251 via the second AI model M2 may be as follows. First, the server 200 may obtain the status information 234 of the computing resources 210 in the server 200 itself, which includes information about current allocation of the computing resources 210 to the VNFs 251, a clock speed of currently allocated CPU cores, or the like. Furthermore, the server 200 may obtain the predicted traffic 233 via the first AI model M1 and the status information 235 of the computing resources 210R in the associated server 200R from the associated server 200R. The server 200 may adjust allocation of the computing resources 210 to the VNFs 251 using the obtained pieces of information (e.g., the status information 234 of the computing resources 210, the predicted traffic 233, and the status information 235 of the computing resources 210R). For example, based on the predicted traffic 233 being greater than current traffic, allocation of the computing resources 236 may be adjusted (236) by additionally allocating the computing resources 210 to the VNFs 251 or increasing a clock speed of previously allocated CPU cores.

As another example, when the associated server 200R includes the VNFs 251 R that match some of the VNFs 251 included in the server 200, and an occupancy rate of the computing resources 210R in the associated server 200R is poor, the server 200 may predict that a small number of tasks will be processed by the associated server 200R and adjust allocation of computing resources (236) by additionally allocating the computing resources 210 to the VNFs 251 in the server 200 or increasing a clock speed of previously allocated CPU cores.

Figure 3:
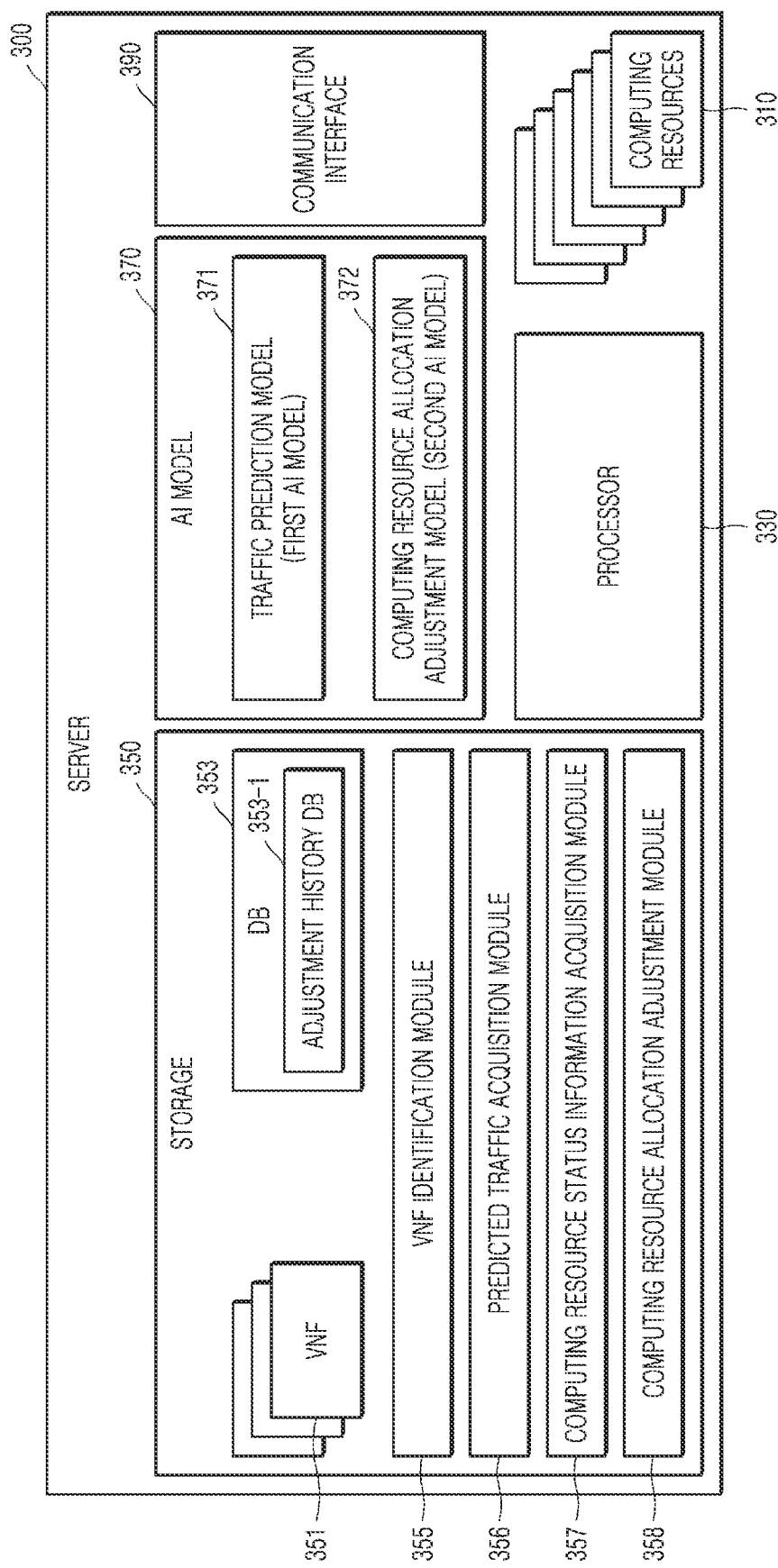
FIG. 3 is a block diagram of a configuration of a server according to various example embodiments of the disclosure.

FIG. 3 is a block diagram of a configuration of a server 300 according to various example embodiments of the disclosure.

Referring to FIG. 3, the server 300 may include a plurality of computing resources 310, a processor 330, a storage 350, an AI model 370, and a communication interface 390. All components shown in FIG. 3 are not essential components of the server 300. The server 300 may be implemented with more or fewer components than those shown in FIG. 3.

The computing resources 310 may refer, for example, to a CPU as resources for computation. In various example embodiments, the computing resources 310 may be implemented by a multicore CPU. The computing resources 310 may be implemented similarly to the computing resources 210 described with reference to FIG. 2.

The communication interface 390 (including, for example, communication circuitry) may communicate with other servers or a core network CN. In various example embodiments, the communication interface 390 may obtain status information of computing resources in each associated server from the corresponding associated server, and may provide status information of its own computing resources to another server. By communicating with the core network CN, the communication interface 390 may receive service request information from a UE, receive information about a task(s) to be processed, and provide the processed task(s) and a service corresponding thereto to the UE.

The storage 350 may store a program to be executed by the processor 330 (to be described below) in order to control an operation of the server 300. The storage 350 may store a program including at least one instruction for controlling the operation of the server 300. Program code and instructions that are readable by the processor 330 may be stored in the storage 350. In various example embodiments, the processor 330 may be implemented to execute instructions or code of a program stored in the storage 350. The storage 350 may store data input to or output from the server 300. In various example embodiments, the storage 350 may store a plurality of VNFs 351 allocated to the server 300.

The storage 350 may include at least one type of storage medium, for example, at least one of a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EEPROM), PROM, a magnetic memory, a magnetic disc, or an optical disc.

Programs stored in the storage 350 may be categorized into a plurality of modules according to their functions. For example, the storage 350 may include a VNF identification module 355, a predicted traffic acquisition module 356, a computing resource status information acquisition module 357, and a computing resource allocation adjustment module 358. In addition, the storage 350 may include a database (DB) 353.

The AI model 370 may include AI models used in adjusting an allocation of computing resources to a plurality of VNFs, according to various example embodiments. In an example embodiment, the method according to the present disclosure may include operations using two AI models, and thus, the AI model 370 may include a first AI model 371 and a second AI model 372. The first AI model 371 may be used in an operation of the server 300 for obtaining predicted traffic. The second AI model 372 may be used in an operation of the server 300 for allocating the computing resources 310 to the VNFs 351 or adjusting the allocation. In an example embodiment, the AI model 370 may be included in the storage 350.

The processor 330 may control all operations of the server 300. For example, the processor 330 may control all operations of the computing resources 310, the AI model 370, the communication interface 390, and the storage 350 by executing programs stored in the storage 350. The processor 330 may be implemented similarly to the processor 230 described with reference to FIG. 2.

The processor 330 may include hardware components that perform arithmetic, logical, and input/output (I/O) operations, and signal processing. For example, the processor 330 may include at least one of a CPU, a microprocessor, a graphics processing unit (GPU), application specific integrated circuits (ASICs), digital signal processors (DSPs), programmable logic devices (PLDs), field programmable gate arrays (FPGAs), or other processing circuitry, but is not limited thereto.

By executing at least one instruction of the VNF identification module 355 among programs stored in the storage 350, the processor 330 may identify the VNFs 351 associated with the task(s) related to UEs connected to the server 300 in order to process the task(s). For example, the server 300 may identify the VNFs 351 according to the task(s) associated therewith or according to an implemented VM. In various example embodiments, identification information of the VNFs 351 may be received from a VNFM located outside (external to) the server 300. The VNFM may manage servers that process task(s) related to UEs together and a plurality of VNFs. In various example embodiments, the processor 330 may control the communication interface 390 to receive the identification information of the VNFs 351. For example, when the VNFM distributes the VNFs 351 to each of the servers, the VNFM may distribute the identification information of the VNFs 351 together therewith.

By executing at least one instruction of the predicted traffic acquisition module 356 among programs stored in the storage 350, the processor 330 may obtain predicted traffic (that is, traffic expected to be generated within the server 300) when processing task(s) through the VNFs 351. For example, the predicted traffic may refer, for example, to an amount of traffic that will occur at a particular time point in the future.

In various example embodiments, when at least one instruction of the predicted traffic acquisition module 356 is executed, the processor 330 may control the first AI model 371 to obtain the predicted traffic. For example, when at least one instruction of the predicted traffic acquisition module 356 is executed, the predicted traffic (233 of FIG. 2) may be obtained from the first AI model 371. In this case, the first AI model 371 may be implemented similarly to the first AI model M1 described with reference to FIG. 2. For example, the first AI model 371 may be trained to obtain predicted traffic using, as input values, the traffic history information and waiting traffic (that I,s traffic waiting in a buffer of the server 300). Before controlling the first AI model 371, the processor 330 may control the DB 353 to obtain traffic history information from the DB 353 and provide the obtained traffic history information to the first AI model 371.

By executing at least one instruction of the computing resource status information acquisition module 357 among programs stored in the storage 350, the processor 330 may obtain, from at least one associated server, status information of computing resources in the associated server. For example, the status information of the computing resources in the associated server may include information about to which VNF(s) and to what extent the computing resources are allocated in the associated server, and an overall occupancy rate of the computing resources. In various example embodiments, the computing resource status information acquisition module 357 may obtain status information of the computing resources 310 in the server 300 itself.

By executing at least one instruction of the computing resource status information allocation adjustment module 358 among programs stored in the storage 350, the processor 330 may adjust allocation of the computing resources 310 to the VNFs 351 based on status information of computing resources and the predicted traffic that have been previously obtained. The status information of the computing resources may include the status information of the computing resources in an associated server, and in various example embodiments, may further include the status information of the computing resources 310 in the server 300 itself. For example, an operation of adjusting allocation of the computing resources 310 may include an operation of determining how to distribute the limited computing resources (CPU) 310 possessed by the server 300 among the VNFs 351 and an operation of determining how to set a clock speed of the computing resources (CPU) 310 respectively distributed to the VNFs 351.

In various example embodiments, when at least one instruction of the computing resource allocation adjustment module 358 is executed, the processor 330 may control the second AI model 372 to adjust allocation of the computing resources 310 to the VNFs 351. For example, when the computing resource allocation adjustment module 358 is executed, a result of adjusting allocation of the computing resources 310 may be derived from the second AI model 372. In this case, the second AI model 372 may be implemented similarly to the second AI model M2 described with reference to FIG. 2. For example, the second AI model 372 may be trained to adjust allocation of the computing resources 310 in the server 300 using, as input values, the predicted traffic and the status information of the computing resources in an associated server. In various example embodiments, the second AI model 372 may further include the status information of the computing resources 310 in the server 300 as an input value. Before controlling the second AI model 372, the processor 330 may obtain the predicted traffic by executing at least one instruction stored in the predicted traffic acquisition module 356 and obtain the status information of the computing resources in the associated server and the status information of the computing resources 310 in the server 300 itself by executing at least one instruction stored in the computing resource status information acquisition module 357. The obtained predicted traffic and status information of the computing resources (or computing resources 300) may be provided as inputs to the second AI model 372.

The DB 353 included in the storage 350 may include a collection of massive amounts of data. In various example embodiments, the DB 353 may include an adjustment history DB 353-1 related to an allocation adjustment history of the computing resources 310. In various example embodiments, the DB 353 may be used in an operation of obtaining the predicted traffic or an operation of training and refining the AI model 370. All pieces of data obtained in a method, performed by a server, of adjusting allocation of computing resources for a plurality of VNFs by the server according to various embodiments may be stored in the DB 353, and thus, the obtained data may be used in a recursive manner.

Figure 4:
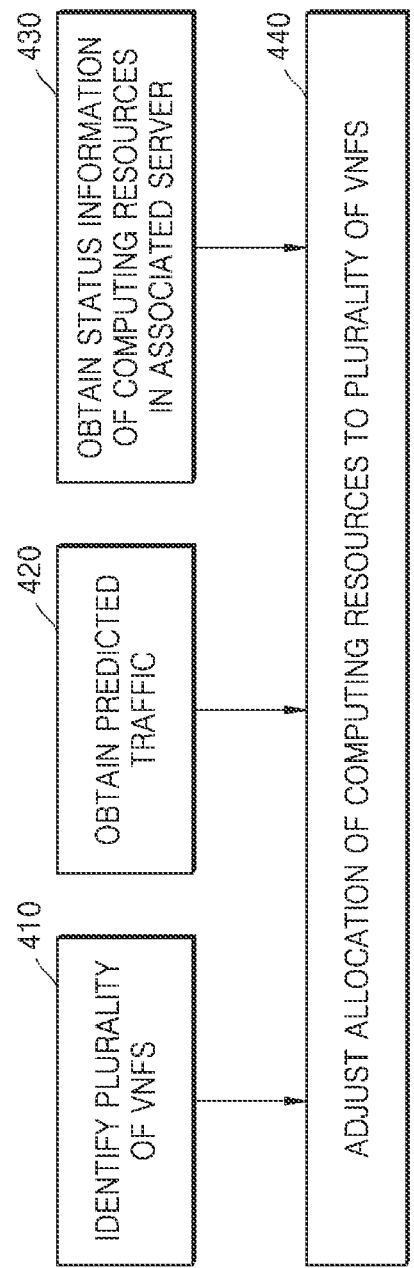
FIG. 4 is a flowchart illustrating a method, performed by a server, of adjusting allocation of computing resources to a plurality of VNFs, according to various example embodiments of the disclosure.

FIG. 4 is a flowchart of a method, performed by a server, of adjusting allocation of computing resources to a plurality of VNFs, according to various example embodiments.

In operation 410, a plurality of VNFs may be identified. The VNFs may be assigned to a server to process task(s) related to UEs. In various example embodiments, the server may identify the VNFs related to the task(s) using identification information of the VNFs or identification information of an associated server.

For example, a first task may be processed via first through fourth VNFs, among which the first and second VNFs may be assigned to a first server, and the second through fourth VNFs may be assigned to a second server. In this case, because the second VNF is assigned both to the first and second servers, the first server may be considered to have a correlation to the second server. Thus, from the perspective of the first server, the second server may be an associated server. In this case, the first server may distinguish between the assigned first and second VNFs and identify the second server as an associated server from the perspective of the second VNF.

In operation 420, predicted traffic may be obtained. The predicted traffic may refer, for example, to traffic to be generated in the server at a particular time point in the future when processing task via the VNFs. In various example embodiments, the predicted traffic may include traffic to be generated in the entire server or traffic to be generated in relation to a particular VNF. In various example embodiments, the predicted traffic may include information corresponding to traffic to occur at a plurality of future time points.

For example, the predicted traffic may be obtained via an AI model using, as input values, traffic history information and waiting traffic (that is, traffic waiting in a buffer). In various example embodiments, the operation of obtaining the predicted traffic may be an operation of obtaining the predicted traffic according to a preset period. The preset period may be, for example, 1 minute. When predicted traffic is obtained at intervals of a 1-minute period, changes in traffic over time may be tracked every 1 minute, and a near-real-time response to the changes in traffic is allowed.

In operation 430, status information of computing resources in an associated server may be obtained. For example, the associated server may include another server that processes task(s) related to UEs connected to the server. In various example embodiments, status information of computing resources in each of two or more associated servers may be obtained from the corresponding associated servers.

For example, when the first and second VNFs among the first through fourth VNFs associated with the first task are assigned to the first server while the second through fourth VNFs are assigned to the second server, the first server may obtain, from the second server that is the associated server, status information regarding how computing resources in the second server are allocated to the second through fourth VNFs.

In operation 440, allocation of computing resources to the VNFs may be adjusted. For example, allocation of computing resources to the VNFs may be adjusted based on the predicted traffic and the status information of the computing resources in the associated server(s). In various example embodiments, when computing resources in a corresponding server are newly allocated or the existing allocation is adjusted using predicted traffic and information about another associated server, it is possible to quickly respond to traffic patterns that change over time in real-time and efficiently utilize the computing resources.

Allocation of computing resources to a plurality of VNFs may be adjusted according to a period during which predicted traffic is obtained. For example, an operation of obtaining predicted traffic may correspond one-to-one and be performed alternately with an operation of adjusting allocation of computing resources. In other words, each time the predicted traffic is obtained, the allocation of computing resources may be adjusted using the predicted traffic. In various example embodiments, allocation of computing resources to a plurality of VNFs may be adjusted only when a difference between predicted traffic and current traffic exceeds a preset threshold. For example, even when predicted traffic is obtained for each preset period, allocation of computing resources may not be adjusted every time the predicted traffic is obtained, but may be adjusted only when excessive changes in traffic are predicted at a later time point due to a large difference between the predicted traffic and current traffic. For example, when predicted traffic undergoes little change compared to current traffic or when the rate of increase or decrease in traffic for each of a plurality of VNFs remains the same so that a change in computing resources previously allocated to the VNFs is not required, an operation of adjusting allocation of computing resources to the VNFs may include an operation of maintaining the allocation of the computing resources.

In various example embodiments, an AI model using predicted traffic and status information of computing resources in an associated server(s) as input values may be used for adjusting allocation of computing resources to a plurality of VNFs.

For example, when the first and second VNFs among the first through fourth VNFs associated with the first task are assigned to the first server while the second through fourth VNFs are assigned to the second server, an operation of the first server adjusting allocation of computing resources for the first and second VNFs may be performed as follows. First, the first server may obtain predicted traffic that is expected to be generated in relation to the first and second VNFs. Furthermore, the first server may obtain, from the second server (that is an associated server), status information regarding how computing resources in the second server are allocated to the second through fourth VNFs. The first server may adjust the allocation of computing resources to the first and second VNFs based on the obtained predicted traffic and status information of computing resources in the associated server. For example, based on predicted traffic related to the second VNF being greater than predicted traffic related to the first VNF in the first server, or a small amount of computing resources in the second server being allocated to the second VNF, the first server may adjust allocation of computing resources by decreasing the amount of computing resources allocated to the first VNF and increasing the amount of computing resources allocated to the second VNF.

Figure 5:
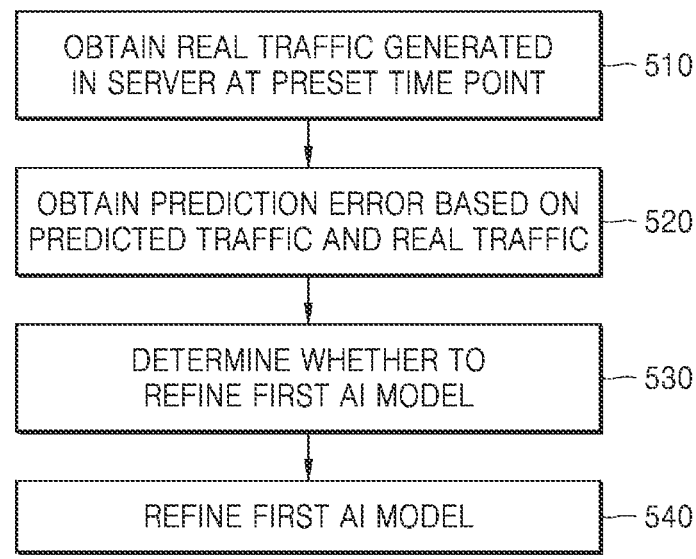
FIG. 5 is a flowchart illustrating an operation of a server refining a first artificial intelligence (AI) model used in an operation of obtaining predicted traffic, according to various example embodiments of the disclosure.

FIG. 5 is a flowchart illustrating an operation of a server refining a first AI model used in an operation of obtaining predicted traffic, according to various example embodiments.

In various example embodiments, a server may obtain predicted traffic using a first AI model trained to output the predicted traffic using waiting traffic in a buffer and traffic history information as input values. For optimization of the first AI model, the server may further perform an operation of refining the first AI model.

In operation 510, real traffic generated in the server at a preset time point may be obtained. Unlike the predicted traffic, the real traffic refers to traffic actually generated in the server by processing task(s) through a plurality of VNFs.

In operation 520, a prediction error may be obtained based on the real traffic and predicted traffic at a particular time point. The prediction error corresponds to an error in predicting traffic. In various example embodiments, the prediction error may be obtained from a difference between the predicted traffic and the real traffic.

In operation 530, it may be determined whether the first AI model is to be refined based on a result of a comparison between the prediction error and a threshold (e.g., a preset threshold). In various example embodiments, whether the first AI model is to be refined may be determined for each preset time period. When the prediction error becomes excessively large while continuously monitoring the difference between the predicted traffic and the real traffic, the first AI model may be refined for optimization.

In operation 540, the first AI model may be refined based on a determination that the refining is to be performed. By performing the refining, a pattern of traffic over time may be predicted more accurately.

Figure 6:
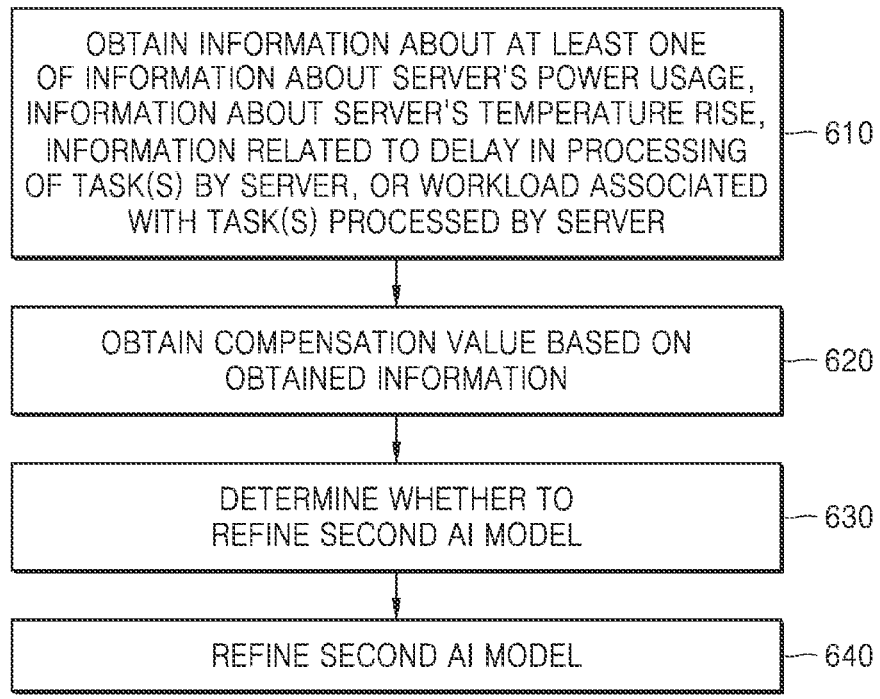
FIG. 6 is a flowchart illustrating refining of a second AI model used in an operation of a server adjusting allocation of computing resources to a plurality of VNFs, according to various example embodiments of the disclosure.

FIG. 6 is a flowchart illustrating refining a second AI model used in an operation of a server adjusting allocation of computing resources to a plurality of VNFs, according to various example embodiments.

In various example embodiments, a server may adjust allocation of computing resources therein using a second AI model trained to adjust the allocation of the computing resources using, as input values, predicted traffic, status information of the computing resources in the server itself, and status information of computing resources in an associated server. For optimization of the second AI model, the server may further perform an operation of refining the second AI model.

In operation 610, information about at least one of information about a server's power usage, information about a server's temperature rise, information related to a delay in processing of task(s) by the server, or a workload associated with the task(s) processed by the server may be obtained. Information obtained by the server for optimizing the second AI model is not limited to the above-described information, and various pieces of information that may be used for an operation of refining the second AI model may be obtained.

In operation 620, a compensation value for improvement or optimization of the second AI model may be obtained based on the obtained information. In various example embodiments, a traffic delay may occur, or the server may overheat even though the server has adjusted the allocation of computing resources. In this case, because the delay or overheating may be caused by an error in setting data that is used to adjust the allocation of the computing resources, the second AI model may be modified by applying the obtained compensation value.

In operation 630, it may be determined whether the second AI model is to be refined based on a result of a comparison between the compensation value and a threshold (e.g., a preset threshold). In various example embodiments, whether the second AI model is to be refined may be determined for each preset time period. When an adverse effect occurs due to allocation while continuously observing an effect of adjusting the allocation of computing resources, the second AI model may be refined based on feedback to enable improvement or optimization.

In operation 640, the second AI model may be refined based on a determination that the refining is to be performed. By performing the refining, the allocation of computing resources may be adjusted more accurately.

Figure 7:
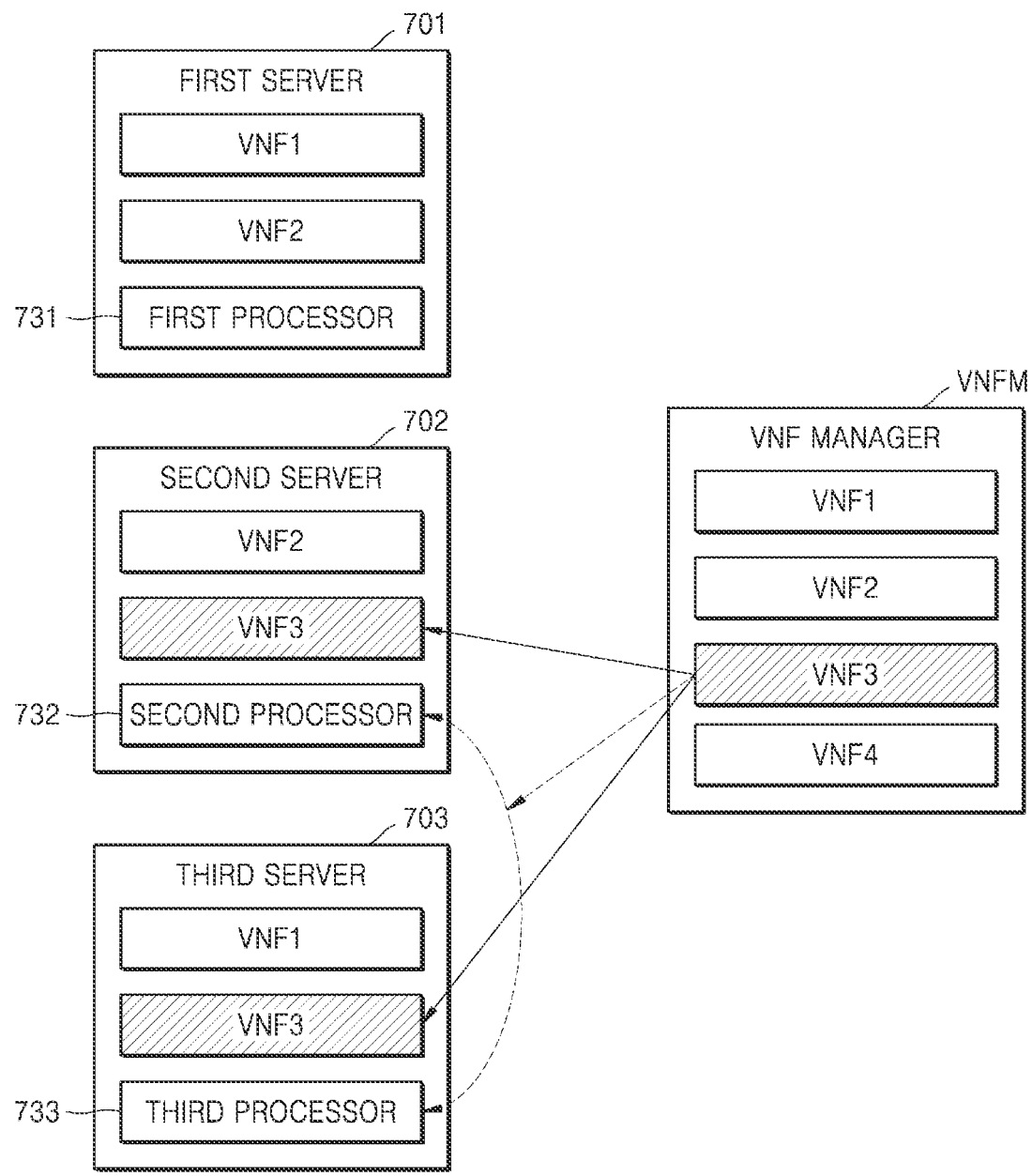
FIG. 7 illustrates an operation of a server receiving identification information of a plurality of VNFs and identification information of an associated server from a VNF manager that manages servers and the VNFs, according to various example embodiments of the disclosure.

FIG. 7 illustrates an operation of a server receiving identification information of a plurality of VNFs and identification information of an associated server from a VNFM that manages servers and the VNFs, according to various example embodiments.

Referring to FIG. 7, a VNFM may define one or more VNFs (e.g., VNF1, VNF2, VNF3, and VNF4) from NFs corresponding to task(s) related to UEs. Thereafter, the VNFM may assign each of the defined VNFs VNF1, VNF2, VNF3, and VNF4 to a plurality of servers, e.g., first through third servers 701, 702, and 703.

In various example embodiments, a particular VNF may be assigned to a plurality of servers, and a plurality of VNFs may be assigned to a particular server. For example, VNF1 may be assigned to the first and third servers 701 and 703, VNF2 may be assigned to the first and second servers 701 and 702, and VNF3 may be assigned to the second and third servers 702 and 703. From the perspective of each server, two VNFs (VNF1 and VNF2) may be assigned to the first server 701, two other VNFs (VNF2 and VNF3) may be assigned to the second server 702, and another two VNFs (VNF1 and VNF3) may be assigned to the third server 703. In other words, a different service chain (a sequence of VNFs) may be assigned to each of the first through third servers 701, 702, and 703.

Each of the first through third servers 701, 702, and 703 may process task(s) requested from a UE via some of the VNFs assigned thereto by the VNFM. Each of the servers 701, 702, and 703 may allocate computing resources (CPU) necessary for computation to VNFs assigned thereto and adjust the allocation. For example, a first processor 731 of the first server 701 may determine the amount and speed of computing resources respectively distributed to the assigned VNFs VNF1 and VNF2.

A method, performed by the second server 702, of adjusting allocation of computing resources to a plurality of VNFs will be described in more detail with reference to FIG. 7. The second server 702 may first identify a plurality of VNFs related to a task(s). In other words, the second server 702 may recognize and distinguish between the VNFs (VNF2 and VNF3) assigned thereto.

Next, the second server 702 may obtain predicted traffic expected to be generated therein. For example, the second server 702 may obtain traffic to be generated in relation to VNF2 separately from traffic to be generated in relation to VNF3, or may obtain traffic to be generated for the entirety of second server 702.

Subsequently, the second server 702 may obtain, from at least one associated server, status information of computing resources in an associated server(s). From the perspective of VNF2, the first server 701 may be an associated server, and from the perspective of VNF3, the third server 703 may be an associated server. Thus, the second server 702 may obtain status information of computing resources in the first server 701 and status information of computing resources in the third server 703. However, this is merely an example embodiment, and an associated server(s) may be determined based on criteria other than whether the same VNF is included.

Furthermore, the second server 702 may adjust allocation of computing resources to each of VNF2 and VNF3 based on the obtained status information of the computing resources in the associated servers and the predicted traffic. For example, when the second server 702 adjusts allocation of computing resources to VNF3, how much of its own resources that the third server 703 including VNF3 has allocated to VNF3 may be taken into consideration. For example, when the third server 703 allocates a small amount of computing resources to VNF3, the second server 702 may adjust allocation of the computing resources by allocating more computing resources to VNF3 or increasing a clock speed of the allocated CPU core.

In various example embodiments, identification information of an associated server may be included in a VNF. For example, when the VNFM distributes a VNF to each server, identification information of server(s) to which the VNF is assigned may be included in the VNF. For example, information indicating 'the third server 703 has also been assigned VNF3' may be included in identification information of VNF3 received by the second server 702.

In various example embodiments, transmission of identification information of an associated server may be performed separately from allocation of a VNF. For example, identification information of the VNF3 may be received by receivers respectively included in the second and third servers 702 and 703 (as indicated by solid lines), and information indicating that the second and third servers 702 and 703 have been assigned VNF3 may be received by a second processor 732 of the second server 702 and a third processor 733 of the third server 703 (as indicated by dashed lines).

Figure 8:
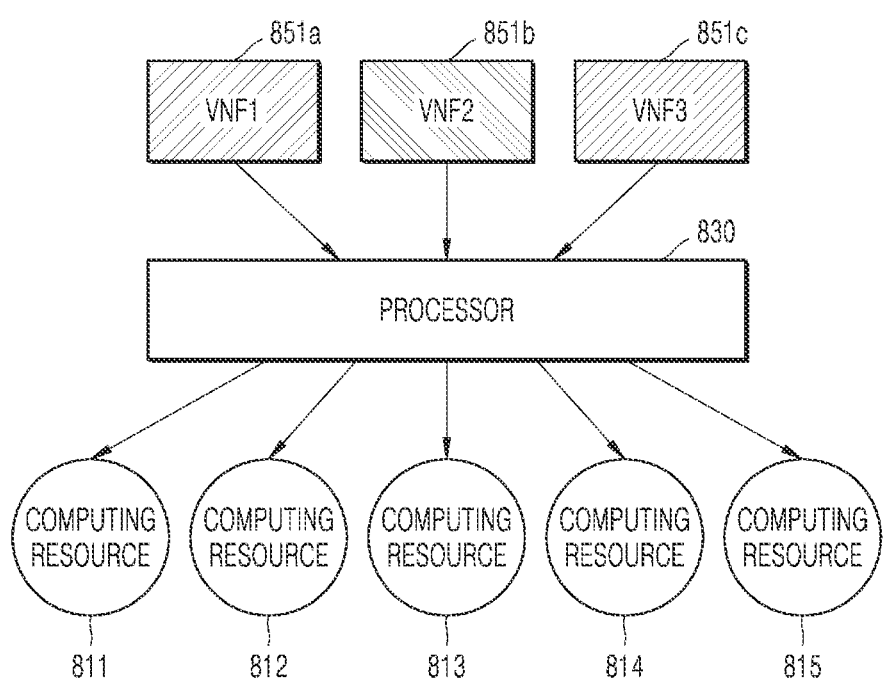
FIG. 8 illustrates an operation of a server adjusting allocation of computing resources to a plurality of VNFs, according to various example embodiments of the disclosure.

FIG. 8 illustrates an operation of a server adjusting allocation of computing resources 811, 812, 813, 814 and 815 to a plurality of VNFs 851a, 851b, and 851c, according to various example embodiments.

Referring to FIG. 8, the server may adjust allocation of the computing resources 811, 812, 813, 814 and 815 through a processor 830. In this case, resources may be stably distributed through the processor 830, compared to when each of the VNFs 851a, 851b, and 851c accesses all the computing resources 811, 812, 813, 814 and 815. When each of the VNFs 851a, 851b, and 851c directly accesses the computing resources 811, 812, 813, 814, and 815, computation operations may be excessively concentrated on a particular computing resource, and it is difficult to determine whether a CPU core is turned on or off.

In various example embodiments, the processor 830 may predict traffic to be generated in the server and adjust allocation of computing resources to a plurality of VNFs based on the predicted traffic and obtained status information of computing resources in an associated server. Accordingly, computing resource allocation may be stably adjusted, and a quick response to unexpected traffic patterns in real-time is allowed. In addition, according to various embodiments, computing resources may be efficiently utilized, and consumption of more power than necessary or occurrence of a delay in processing of task may be reduced or prevented.

In various example embodiments, traffic to be generated in a server may be predicted and allocation of computing resources may be adjusted using one or more AI models. In this case, by respectively refining the one or more AI models based on a magnitude of a prediction error or a compensation value, accuracy of traffic prediction may be increased, and allocation of computing resources may be further improved or optimized.

The above example embodiments are provided for illustration, and it will be understood by those of ordinary skill in the art that various changes in form and details may be readily made therein without departing from true spirit and full scope of the disclosure. Accordingly, it should be understood that the foregoing example embodiments of the disclosure are provided for illustrative purposes only and are not to be construed in any way as limiting the disclosure. For example, each component defined as an integrated component may be implemented in a distributed manner, and likewise components defined as being separate or distributed components may be implemented in an integrated manner.

The scope of the disclosure is defined not by the detailed description thereof but by the appended claims, and all the changes or modifications within the meaning and scope of the appended claims and their equivalents will be construed as being included in the scope of the disclosure.

What is claimed is:

1. A method, performed by a server, of adjusting allocation of computing resources to a plurality of virtualized network functions (VNFs), the method comprising:
    identifying, for processing a task related to user equipments (UEs) connected to the server, a plurality of VNFs related to the task assigned to the server;
    identifying at least one associated server having an association relationship with the server, wherein the at least one associated server includes a server assigned with at least one VNF among the plurality of VNFs assigned to the server;
    obtaining predicted traffic expected to be generated in the server by processing the task via the assigned plurality of VNFs based on traffic history information and waiting traffic waiting in a buffer of the server;
    obtaining, from the at least one associated server, status information of computing resources allocated to the at least one VNF assigned to both the server and the associated server; and
    adjusting allocation of the computing resources to the plurality of VNFs assigned to the server based on the status information of the computing resources obtained from the at least one associated server and the predicted traffic,
    wherein the obtaining of the predicted traffic comprises obtaining the predicted traffic using a first artificial intelligence (AI) model trained to obtain the predicted traffic using, as input values, the traffic history information and the waiting traffic waiting in a buffer of the server,
    wherein the method further comprises:
        obtaining real traffic generated in the server by processing the task via the plurality of VNFs;
        obtaining a prediction error based on the predicted traffic and the real traffic;
        determining whether to refine the first AI model based on a result of a comparison between the prediction error and a preset threshold; and
        refining the first AI model based on a determination to refine the first artificial intelligence model.

2. The method of claim 1, further comprising receiving, from a VNF manager that manages servers that together process the task related to the UEs and the plurality of VNFs, identification information of the plurality of VNFs and identification information of the at least one associated server.

3. The method of claim 1, wherein
    the adjusting of the allocation of the computing resources to the plurality of VNFs comprises adjusting the allocation of the computing resources using a second AI model.

4. The method of claim 1, wherein the first AI model includes a deep neural network (DNN) with a long short-term memory (LSTM) structure.

5. The method of claim 3, wherein the second AI model includes a multi-agent deep reinforcement learning model and is trained to adjust the allocation of the computing resources in the server using, as input values, the predicted traffic, status information of the computing resources in the server, and the status information of the computing resources in the at least one associated server.

6. The method of claim 5, further comprising:
    obtaining information about at least one of information about a server's power usage, information about a server's temperature rise, information related to a delay in processing the task by the server, or a workload associated with the task processed by the server;
    obtaining a compensation value based on the obtained information;
    determining whether to refine the second AI model based on a result of a comparison between the compensation value and a threshold; and
    refining the second AI model based on a determination to refine the second AI model.

7. A server for adjusting allocation of computing resources to a plurality of virtualized network functions (VNFs), the server comprising:
    a plurality of computing resources;
    a communication interface;
    a storage storing a program including one or more instructions; and
    at least one processor configured to execute the one or more instructions stored in the storage to:
    identify, for processing a task related to user equipments (UEs) connected to the server, a plurality of VNFs related to the task assigned to the server;
    identify at least one associated server having an association relationship with the server, wherein the at least one associated server includes a server assigned with at least one VNF among the plurality of VNFs assigned to the server;
    obtain predicted traffic expected to be generated in the server by processing the task via the assigned plurality of VNFs based on traffic history information and waiting traffic waiting in a buffer of the server;
    obtain, from the at least one associated server, status information of computing resources allocated to the at least one VNF assigned to both the server and the associated server, through the communication interface; and
    adjust allocation of the computing resources to the plurality of VNFs assigned to the server based on the status information of the computing resources obtained from the at least one associated server and the predicted traffic, wherein the obtaining of the predicted traffic comprises obtaining the predicted traffic using a first artificial intelligence (AI) model trained to obtain the predicted traffic using, as input values, the traffic history information and the waiting traffic waiting in a buffer of the server, wherein the at least one processor is further configured to execute the one or more instructions to:
  obtain real traffic generated in the server by processing the task via the plurality of VNFs;
  obtain a prediction error based on the predicted traffic and the real traffic;
  determine whether to refine the first AI model based on a result of a comparison between the prediction error and a preset threshold; and
  refine the first AI model based on a determination to refine the first artificial intelligence model.

8. The server of claim 7, wherein the at least one processor is further configured to execute the one or more instructions to receive, from a VNF manager that manages servers that together process the task related to the UEs and the plurality of VNFs, identification information of the plurality of VNFs and identification information of the at least one associated server.

9. The server of claim 7, wherein the at least one processor is further configured to execute the one or more instructions to:
  adjust the allocation of the computing resources to the plurality of VNFs using a second AI model.

10. The server of claim 8, wherein the first AI model includes a deep neural network (DNN) with a long short-term memory (LSTM) structure.

11. The server of claim 9, wherein the second AI model includes a multi-agent deep reinforcement learning model and is trained to adjust the allocation of the computing resources in the server using, as input values, the predicted traffic, status information of the computing resources in the server, and the status information of the computing resources in the at least one associated server.

12. The server of claim 11, wherein the at least one processor is further configured to execute the one or more instructions to:
  obtain information about at least one of information about a server's power usage, information about a server's temperature rise, information related to a delay in processing the task by the server, or a workload associated with the task processed by the server;
  obtain a compensation value based on the obtained information;
  determine whether to refine the second AI model based on a result of a comparison between the compensation value and a threshold; and
  refine the second AI model based on a determination to refine the second AI model.

13. A non-transitory computer-readable recording medium having recorded thereon a program which, when executed by a processor of an electronic device, causes the processor to control the electronic device to perform operations for adjusting allocation of computing resources to a plurality of virtualized network functions (VNFs), the operations comprising:
  identifying, for processing a task related to user equipments (UEs) connected to the server, a plurality of VNFs related to the task assigned to the server;
  identifying at least one associated server having an association relationship with the server, wherein the at least one associated server includes a server assigned with at least one VNF among the plurality of VNFs assigned to the server;
  obtaining predicted traffic expected to be generated in the server by processing the task via the assigned plurality of VNFs based on traffic history information and waiting traffic waiting in a buffer of the server;
  obtaining, from the at least one associated server, status information of computing resources allocated to the at least one VNF assigned to both the server and the associated server; and
  adjusting allocation of the computing resources to the plurality of VNFs assigned to the server based on the status information of the computing resources obtained from the at least one associated server and the predicted traffic,
  wherein the obtaining of the predicted traffic comprises obtaining the predicted traffic using a first artificial intelligence (AI) model trained to obtain the predicted traffic using, as input values, the traffic history information and the waiting traffic waiting in a buffer of the server,
  wherein the operations further comprise:
    obtaining real traffic generated in the server by processing the task via the plurality of VNFs;
    obtaining a prediction error based on the predicted traffic and the real traffic;
    determining whether to refine the first AI model based on a result of a comparison between the prediction error and a preset threshold; and
    refining the first AI model based on a determination to refine the first artificial intelligence model.

14. The method of claim 1, wherein the server and the associated server share a same rack.

15. The method of claim 1, wherein the server and the associated server share a top-of-rack (ToR) switch.

16. The method of claim 1, wherein the allocation adjustment of the computing resources is performed each time predicted traffic is obtained.

17. The method of claim 1, wherein the allocation adjustment of computing resources is performed based on a difference between the predicted traffic and current traffic exceeding a threshold.

* * * * *